United States Patent [19]
Chang

[11] Patent Number: 6,000,762
[45] Date of Patent: Dec. 14, 1999

[54] WHEEL

[76] Inventor: Yao-Tung Chang, 1, Nong 7, Lane 211, Hui Ming St., Yuan Lin, Chang Hua, Taiwan

[21] Appl. No.: 08/958,053

[22] Filed: Oct. 27, 1997

[51] Int. Cl.$^6$ ....................................................... B60B 3/00
[52] U.S. Cl. .................. 301/64.3; 301/64.4; 152/DIG. 10
[58] Field of Search .................................. 301/64.3, 64.4, 301/64.2; 152/DIG. 10

[56] References Cited

U.S. PATENT DOCUMENTS

| | | | |
|---|---|---|---|
| 2,005,628 | 6/1935 | Maranville | 301/64.3 |
| 3,286,757 | 11/1966 | Thomas | 301/64.3 |
| 3,357,747 | 12/1967 | Eldred | 301/64.4 |
| 3,909,065 | 9/1975 | Main | 301/64.3 |
| 4,640,330 | 2/1987 | Frassica | 152/DIG. 10 |

*Primary Examiner*—D. Glenn Dayoan
*Assistant Examiner*—Long Bao Nguyen
*Attorney, Agent, or Firm*—Alan Kamrath; Oppenheimer Wolff & Donnelly LLP

[57] ABSTRACT

A wheel has a tire, two wheel disks disposed in a center of the tire, and a gasket disposed between the two wheel disks. Each of the wheel disks has an axle hole, a plurality of threaded holes, and a plurality of lock holes. The gasket has a center hole, a plurality of threaded apertures, and a plurality of lock apertures. An axle passes through the center hole and the axle holes.

3 Claims, 6 Drawing Sheets

WHEEL

BACKGROUND OF THE INVENTION

The present invention relates to a wheel. More particularly, the present invention relates to a wheel for a heavy vehicle.

Referring to FIGS. 1 and 2, a wheel 1 comprises a tire 3, an inner tube 31 disposed in the tire 3, an air valve 311 disposed on the inner tube 31, and two wheel disks 11 disposed in a center of the tire 3. Each of the wheel disks 11 has an axle hole 111, a plurality of threaded holes 112, and a plurality of lock holes 113. An axle 12 passes through the center hole 121 and the axle holes 111. The threaded holes 112 are passed through with bolts 100. The lock holes 113 are passed through with bolts 100. Each bolt 100 is engaged with a nut 110. An inflation hole 114 is formed on one of the wheel disks 11 to receive the air valve 311. When the tire 3 is inflated, a carcass 32 of the tire 3 is pressed by the wheel disks 11. The gap between the wheel disks 11 may be formed if the wheel disks 11 are not fastened tightly.

SUMMARY OF THE INVENTION

An object of the present invention is to provide a wheel which has a gasket protecting the wheel against leaking air while piercing.

Another object of the present invention is to provide a wheel which can guarantee an air-tight condition of the wheel while rotating.

Accordingly, a wheel comprises a tire, two wheel disks disposed in a center of the tire, and a gasket disposed between the two wheel disks. Each of the wheel disks has an axle hole, an air valve, a plurality of threaded holes, and a plurality of lock holes. The gasket has a center hole, a plurality of threaded apertures, and a plurality of lock apertures. An axle passes through the center hole and the axle holes. The threaded holes match the threaded apertures. The threaded holes and the threaded apertures are passed through with bolts. The lock holes match the lock apertures. The lock holes and the lock apertures are passed through with bolts. Each bolt is engaged with a nut. When the tire is inflated, a carcass of the tire is pressed by the wheel disks.

DETAILED DESCRIPTION OF THE INVENTION

Figure 1:
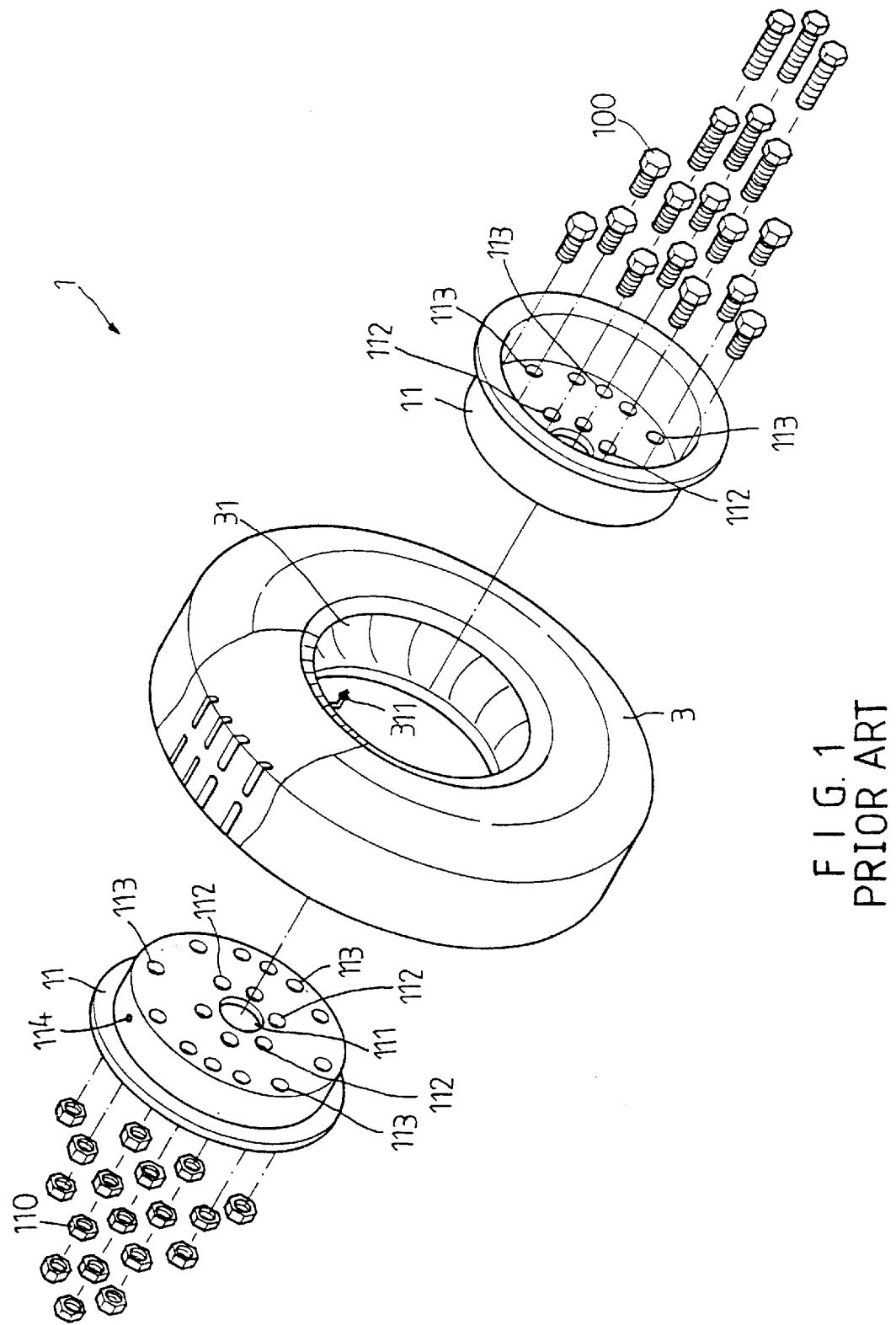
FIG. 1 is a perspective exploded view of a wheel of the prior art.
Figure 2:
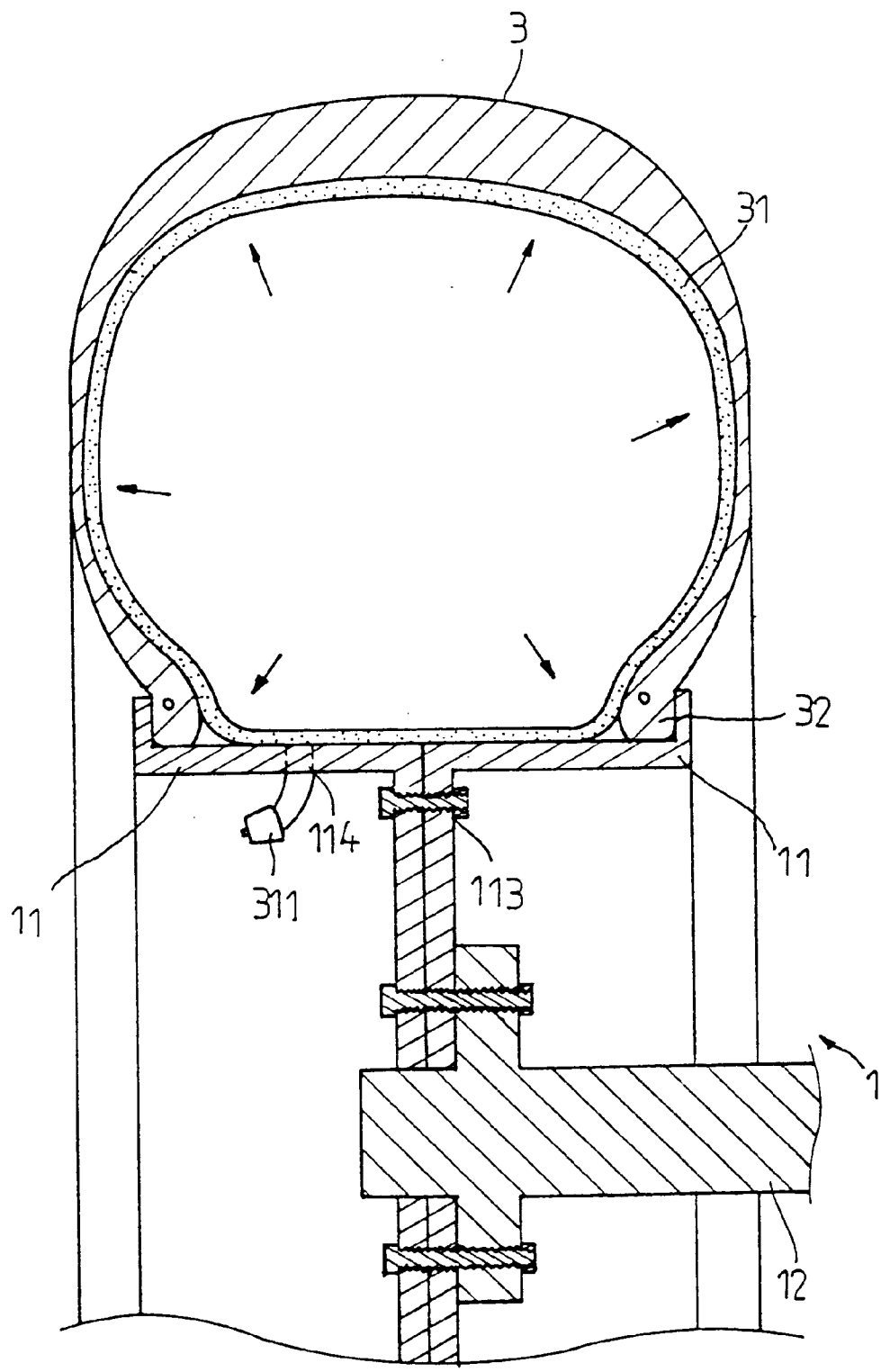
FIG. 2 is a partially sectional schematic view illustrating an operation of a wheel of the prior art.
Figure 3:
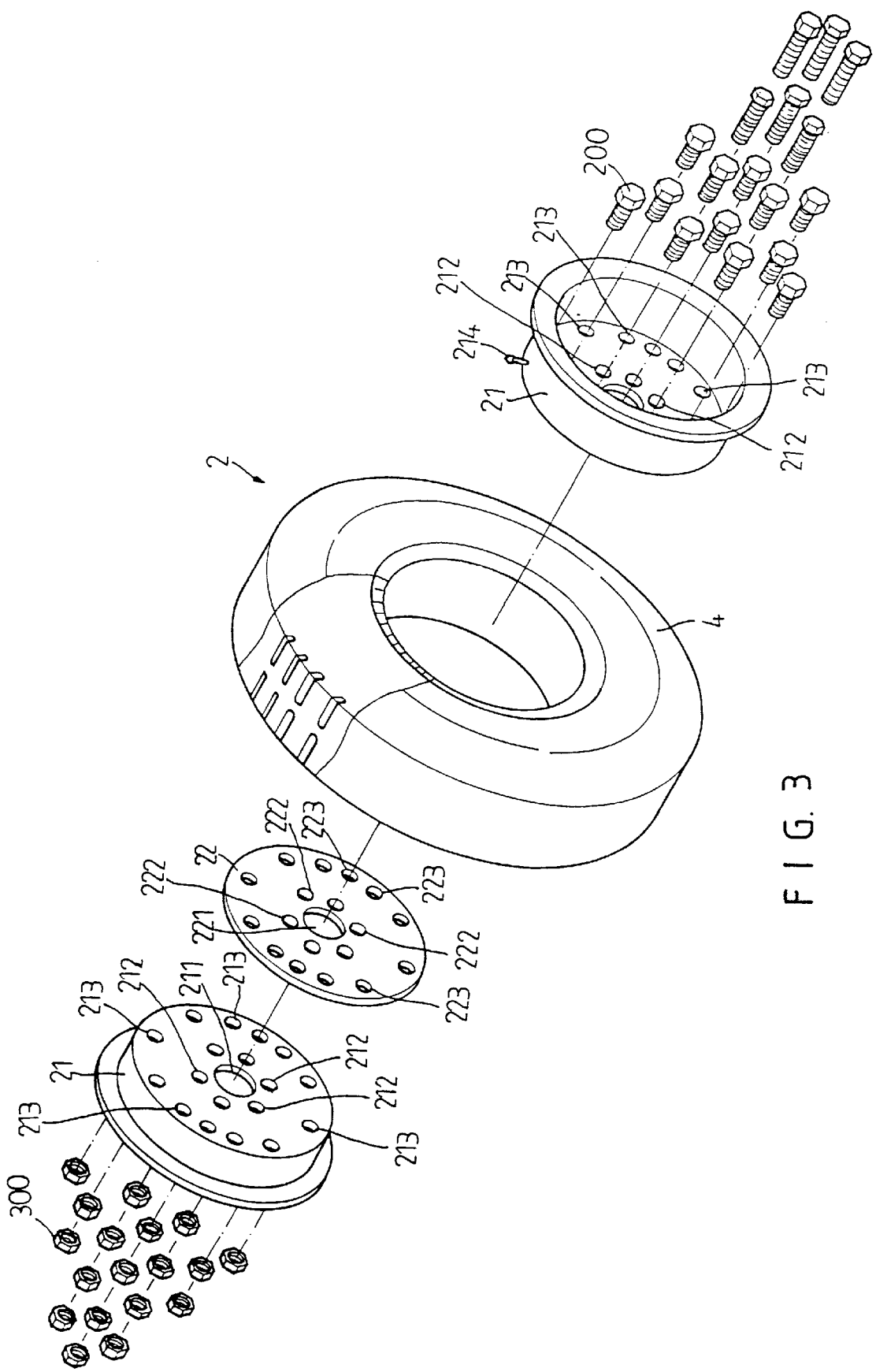
FIG. 3 is a perspective exploded view of a wheel of a preferred embodiment in accordance with the present invention.
Figure 4:
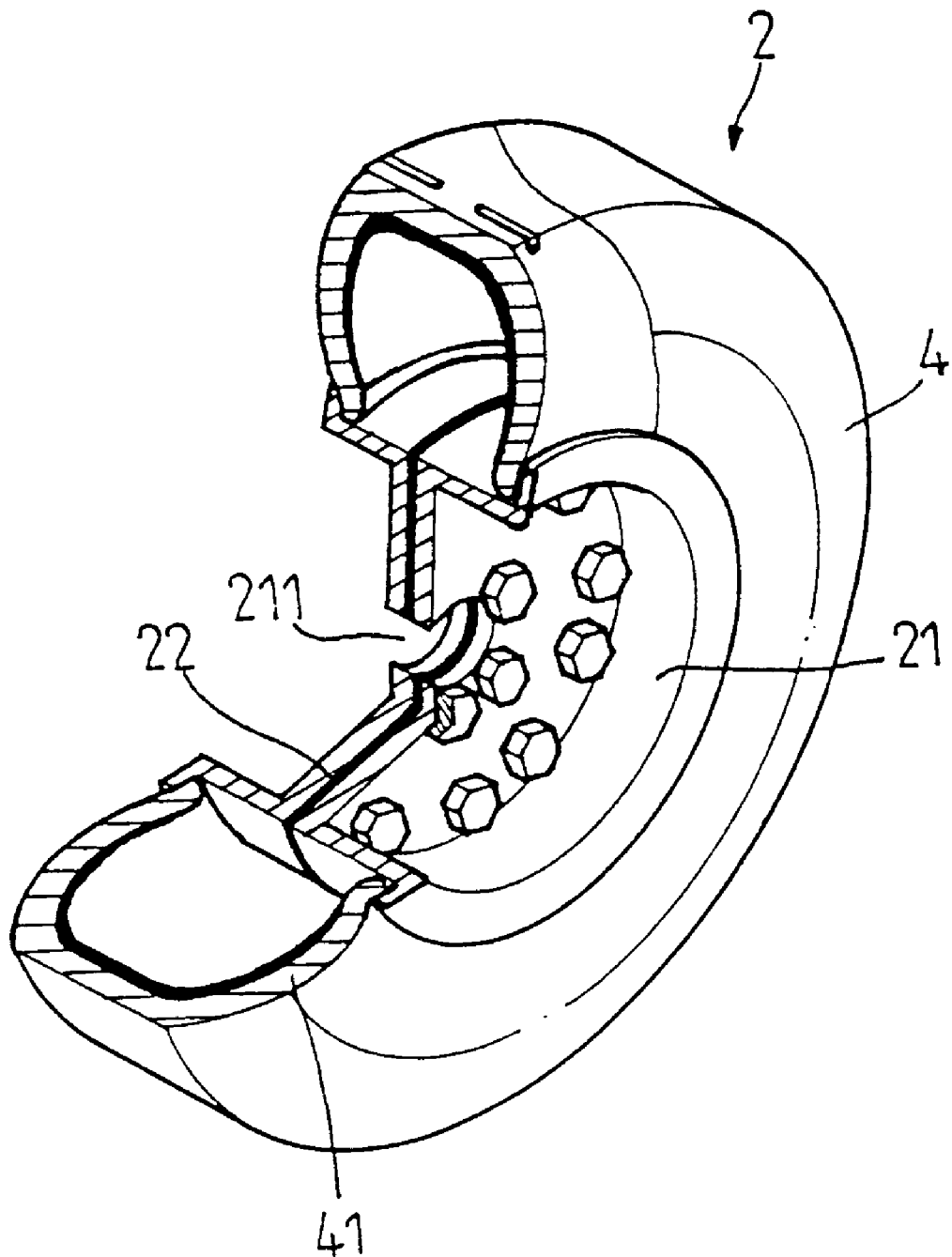
FIG. 4 is a partially sectional view of a wheel of a preferred embodiment in accordance with the present invention.
Figure 5:
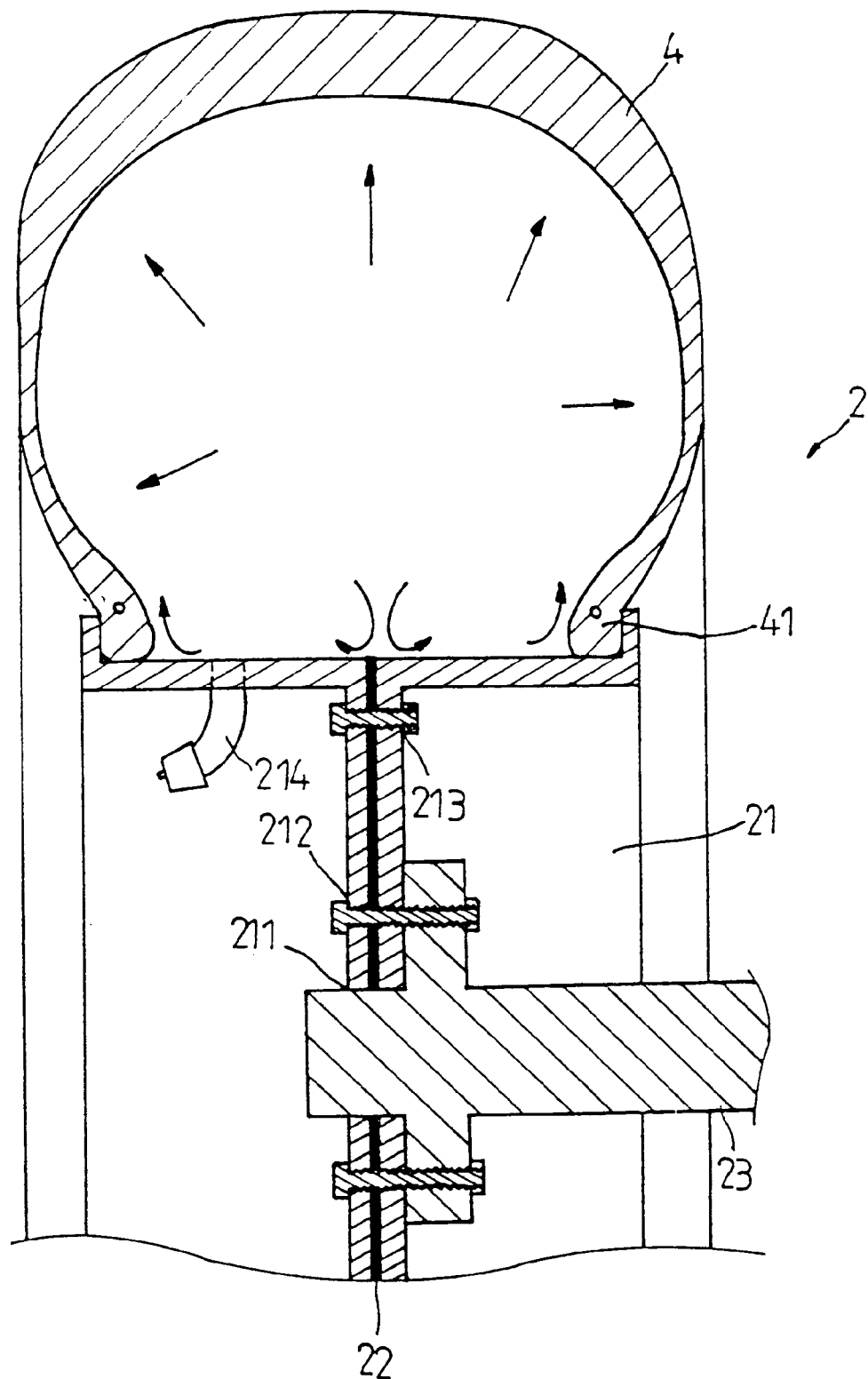
FIG. 5 is a partially sectional schematic view illustrating an operation of a wheel of a preferred embodiment in accordance with the present invention.

Referring to FIGS. 3 to 5, a wheel 2 comprises a tire 4, two wheel disks 21 disposed in a center of the tire 4, and a gasket 22 disposed between the two wheel disks 21. Each of the wheel disks 21 has an axle hole 211, an air valve 214, a plurality of threaded holes 212, and a plurality of lock holes 213. The gasket 22 has a center hole 221, a plurality of threaded apertures 222, and a plurality of lock apertures 223. An axle 23 passes through the center hole 221 and the axle holes 211. The threaded holes 212 match the threaded apertures 222. The threaded holes 212 and the threaded apertures 222 are passed through with bolts 200. The lock holes 213 match the lock apertures 223. The lock holes 213 and the lock apertures 223 are passed through with bolts 200. Each bolt 200 is engaged with a nut 300. When the tire 4 is inflated, a carcass 41 of the tire 4 is pressed by the wheel disks 21.

Figures 6, 6A:
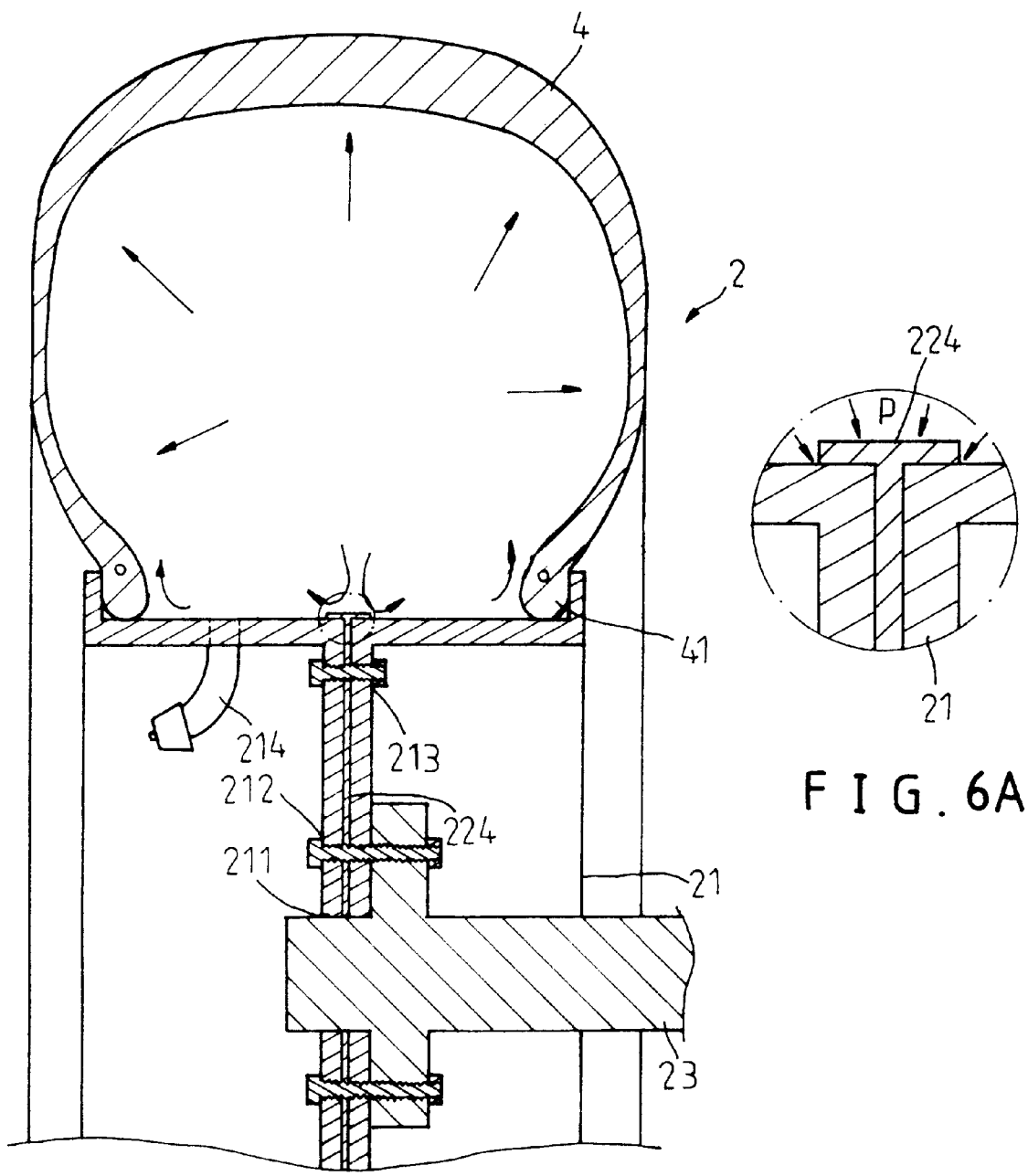
FIG. 6 is a partially sectional schematic view illustrating an operation of a wheel of another preferred embodiment in accordance with the present invention.
FIG. 6A is a partially sectional enlarged view of a T-shaped ring rim of another preferred embodiment in accordance with the present invention.

Referring to FIGS. 6 and 6A, the gasket 22 has a T-shaped ring rim 224 enclosing the rim edges of the wheel disks 21.

The present invention has the following advantages.

Since the gasket 22 is disposed between the two wheel disks 21, the air-tight condition of the wheel 2 can be guaranteed. If the tire 4 is pierced, the gasket 22 can maintain a certain air pressure in the tire 4 for a long period of time.

The gasket 22 can be placed in various types of tires.

The invention is not limited to the above embodiment but various modification thereof may be made. Further, various changes in form and detail may be made without departing from the scope of the invention.

I claim:

1. A wheel comprising, in combination:

a tire, two wheel disks disposed in a center of the tire, a one piece gasket disposed between the two wheel disks, each of the wheel disks having an axle hole, a rim edge, a plurality of threaded holes, and a plurality of lock holes, with at least one of the wheel disks having an air valve, the one piece gasket having a center hole, a plurality of threaded apertures, and a plurality of lock apertures, with the center hole being of a size corresponding to the axle holes of the two wheel disks, an axle passing through the center hole and the axle holes, the threaded holes matching the threaded apertures, the threaded holes and the threaded apertures passed through with bolts, the lock holes matching the lock apertures, and the lock holes and the lock apertures passed through with bolts, with the one piece gasket disposed between the two wheel disks and extending to the rim edges of the two wheel disks.

2. The wheel of claim 1 wherein the one piece gasket further includes a T-shaped ring rim for enclosing the rim edges of the two wheel disks.

3. A wheel comprising, in combination:

a tire, two wheel disks disposed in a center of the tire, a gasket disposed between the two wheel disks, each of the wheel disks having an axle hole, a rim edge, a plurality of threaded holes, and a plurality of lock holes, with at least one of the wheel disks including an air valve, the gasket having a center hole, a T-shaped ring rim, a plurality of threaded apertures, and a plurality of lock apertures, an axle passing through the center hole and the axle holes, the threaded holes matching the threaded apertures, the threaded holes and the threaded apertures passed through with bolts, the lock holes matching the lock apertures, and the lock holes and the lock apertures passed through with bolts, with the T-shaped ring rim enclosing the rim edges of the two wheel disks.

* * * * *